United States Patent [15] 3,666,972
Sangster [45] May 30, 1972

[54] DELAY DEVICE

[72] Inventor: Frederik L. J. Sangster, Emmasingel, Eindhoven, Netherlands
[73] Assignee: U.S. Philips Corporation, New York, N.Y.

[22] Filed: Nov. 12, 1970
[21] Appl. No.: 88,742

[30] Foreign Application Priority Data

Sept. 25, 1970 Netherlands..........................7014135

[52] U.S. Cl. ..........................307/293, 307/221 C, 307/246, 307/304
[51] Int. Cl. ..........................H03k 17/26
[58] Field of Search...................307/221 R, 221 C, 246, 293, 307/304; 328/37, 55

[56] References Cited

UNITED STATES PATENTS

| | | | |
|---|---|---|---|
| 3,395,292 | 7/1968 | Bogert | 307/304 X |
| 3,431,433 | 3/1969 | Ball et al. | 307/221 |
| 3,474,260 | 10/1969 | Frohbach | 307/221 |
| 3,546,490 | 12/1970 | Sangster | 307/246 X |

*Primary Examiner*—Stanley D. Miller, Jr.
*Attorney*—Frank R. Trifari

[57] ABSTRACT

A capacitive delay device comprising a sequence of capacitances which have been interconnected by the main current path of at least one transistor, a feedback path being provided between the output electrode of at least one transistor and the input electrode thereof.

4 Claims, 4 Drawing Figures

INVENTOR.
FREDERIK L.J. SANGSTER

BY [signature]
AGENT

INVENTOR.
FREDERIK L.J. SANGSTER
BY
AGENT

INVENTOR.
FREDERIK L.J. SANGSTER
BY
AGENT

DELAY DEVICE

The invention relates to a device for delaying a train of signal samples of an electrical signal. The device comprises a sequence of stages which each include a first and a second capacitance interconnected by means of the main current path of at least one transistor. The second capacitance of each stage forms the first capacitance of the succeeding stage, while the input electrode circuit of the transistor includes the first capacitance and its output electrode circuit includes the second capacitance. A switching voltage source is arranged to be connected between the control electrode of the transistor and that terminal of the first capacitance which is not connected to the input electrode of the transistor. In a known arrangement of this kind, as described in Netherlands Patent application No. 6,805,705, corresponding to U.S. Pat. application, Ser. No. 817,690, filed Apr. 21, 1969 and now abandoned the transistor is a field effect transistor. The field effect transistors are interconnected in groups so as to form junction points to which switching signals are applied which are ascendingly shifted in phase in the order of the numbers of the junction points.

Applicant recognizes the problem that when a large number of stages was used satisfactory operation was interfered with by the fact that in each stage a slight degradation of sudden voltage variations occurs. This means that when the input voltage abruptly changes from 0 volts to $V$ volts, the output signal at the output of the arrangement changes from 0 volts to ($V$—$\delta$) volts, where $\delta$ is the error voltage. If subsequently the input signal remains at the value of $V$ volts, the output signal will also assume this value. The said effect deleteriously affects the frequency characteristic of the device.

It is an object of the present invention to provide a solution of the said problem, and a device according to the invention is characterized in that feedback is provided between the output electrode of the transistor of at least one of the stages and the input electrode circuit of the said stage, by which feedback during the transfer of information between the first and the second capacitances of the said stage there is produced in series with the input electrode circuit a voltage which is a fraction of the voltage set up at the output electrode of the transistor and which has the same polarity as the threshold voltage of the transistor in the conductive condition thereof.

The invention is based on the recognition that the said signal degradation is due to the fact that the threshold voltage of a transistor depends on the transferred signal value $\Delta V$. When a comparatively small number of stages is used, this effect will not be troublesome, but when a large number of stages, for example several hundreds of stages, are used, it will be highly troublesome. The effect will be particularly strong when the transistors used are field effect transistors. This is due to the fact that electrostatic reaction takes place from the drain electrode by way of the substrate on the boundary region between the source electrode and the drain electrode of the field effect transistor used, and that on the other hand the length of the depletion layer slightly depends on the voltage at the drain electrode. In field effect transistors having a high-resistivity substrate the electrostatic reaction is the dominant factor, whereas in field effect transistors having a low-resistivity substrate the second effect is dominant.

An embodiment of the invention will now be described, by way of example, with reference to the accompanying diagrammatic drawings, in which.

Figure 1:
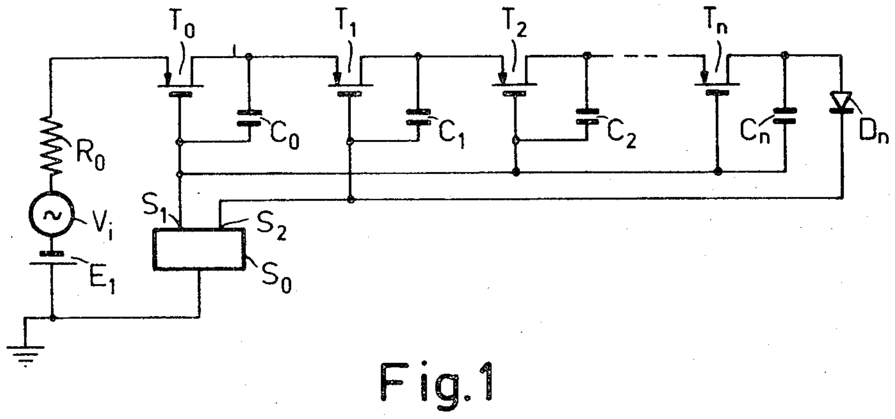
FIG. 1 shows the known arrangement.

In the known delay device shown in FIG. 1, the main current paths of field effect transistors $T_0$, $T_1$, $T_2$, . . . , $T_n$ are connected in series. A capacitor $C_0$ has been connected between the drain and the gate of the transistor $T_0$. A capacitor $C_1$ has been connected between the drain and the gate of the transistor $T_1$. A capacitor $C_2$ has been connected between the drain and the gate of the transistor $T_2$. A capacitor $C_n$ has been connected between the drain and the gate of the transistor $T_n$. The gate of the transistor $T_1$ has been connected to an output $S_2$ of a switching voltage source $S_0$. The gates of the transistors $T_0$ and $T_n$ have been connected to an output $S_1$ of the switching voltage source $S_0$. A diode $D_n$ has one terminal connected to the drain of the transistor $T_n$ and the other terminal connected to the output $S_2$ of the switching voltage source $S_0$. The source of the transistor $T_0$ has been connected to a point of constant potential through the series combination of a resistor $T_0$, an input voltage source $V_i$ and a direct-voltage source $E_1$.

Figure 2:
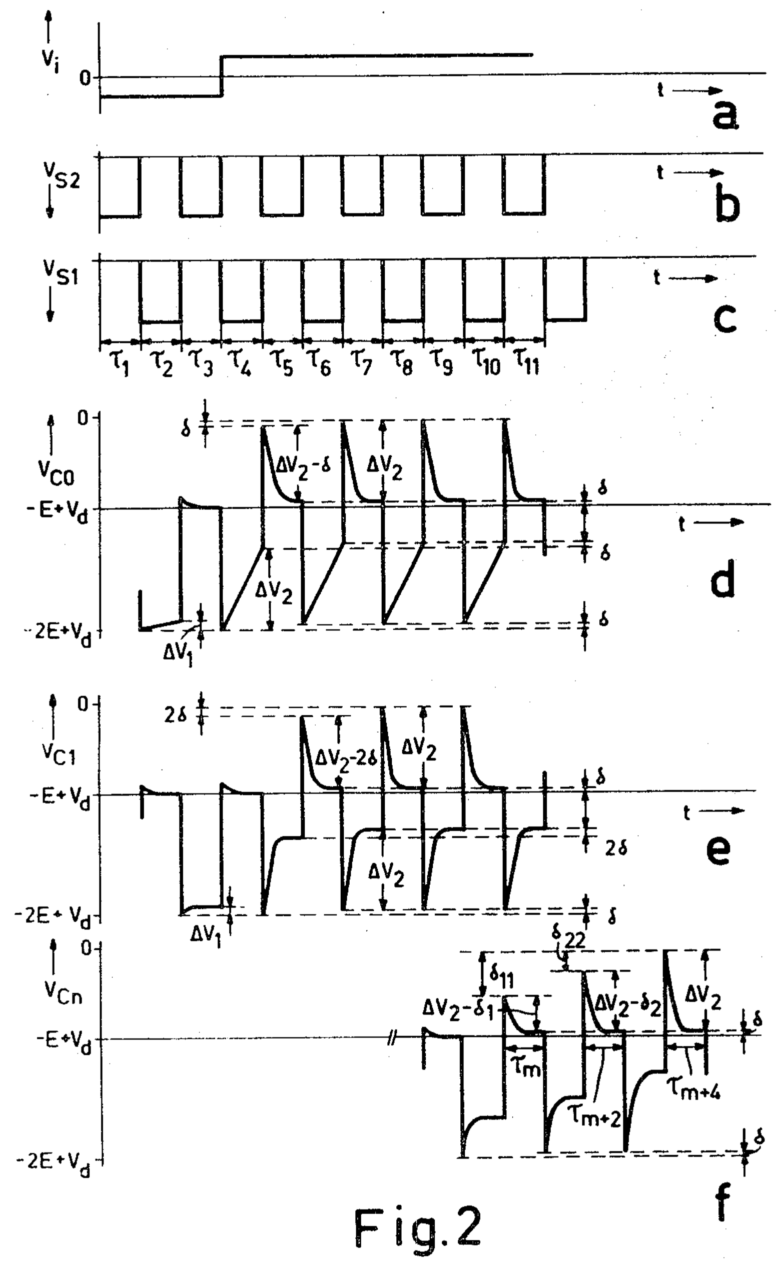
FIG. 2 shows the voltage waveforms at different points in the known arrangement.

The operation of the known arrangement will be described with reference to FIG. 2. FIGS. 2*b* and 2*c* show the voltage waveforms at the outputs $S_2$ and $S_1$, respectively. These voltages are symmetrical square-wave voltages having a maximum of 0 volt and a minimum of $-E$ volts. During the time in which the voltage at the points $S_1$ is negative with respect to earth, i.e. during time intervals $\tau_2$, $\tau_4$, $\tau_6$, $\tau_8$, etc. in FIG. 2*b*, information about the value of the input signal $V_i$ is transferred to the capacitor $C_0$. During the time interval $\tau_2$ the input signal $V_i$ is small, see FIG. 2*a*, whereas during the time interval $\tau_4$ and the following time intervals the input signal $V_i$ is large. During the time interval $\tau_2$ there will flow through the transistor $T_0$ a current of about $V_i/R_0$ amperes, where $V_i$ is the value of the input signal during the time interval $\tau_2$ under consideration and $R_0$ is the resistance of the resistor $R_0$ of FIG. 1. The said current will cause the voltage at the drain of the transistor $T_0$ to increase by an amount $\Delta V_1$, see FIG. 2*d*. During the time interval $\tau_3$ the capacitor $C_0$ is discharged through the transistor $T_1$ until the voltage across this capacitor has become equal to $-(E-V_d)$ volts, where $V_d$ is the threshold voltage of the transistor $T_1$, the value of this threshold voltage being determined by the signal value $\Delta V_1$. During the time interval $\tau_4$ charge is again supplied to the capacitor $C_0$ through the transistor $T_0$, so that the voltage at the drain of the transistor $T_0$ will rise by an amount of $\Delta V_2$ volts, see FIG. 2*d*. During the time interval $\tau_5$ the capacitor $C_0$ is discharged through the transistor $T_1$ until the voltage across this capacitor has become equal to $-(E-V'_d)$ volts, where $V'_d$ is that threshold voltage of the transistor $T_1$ which is associated with the signal value $\Delta V_2$. It has been found that the threshold voltage $V'_d$ associated with the signal value $\Delta V_2$ exceeds the threshold voltage $V_d$ associated with the signal value $\Delta V_1$ by an amount of $\delta$ volts. This means that the voltage drop across the capacitor $C_0$ which occurs during the time interval $\tau_5$ will be equal to $(\Delta V_2-\delta)$ volts instead of to $\Delta V_2$ volts. At the instant at which the time interval $\tau_6$ begins the voltage at the drain of the transistor $T_0$ will be equal to $\{-(2E-V_d)+\}$ volts, see FIG. 2*d*. At the end of the said time interval the voltage at the drain of the transistor $T_0$ will be equal to $\{-(2EV_d)+\delta+\Delta V_2\}$ volts. Consequently, the voltage drop across the capacitor $C_0$ will be equal to $\Delta V_2$ volts during this time interval.

During the time interval $\tau_3$ the capacitor $C_1$ is charged through the transistor $T_1$ until the voltage across this capacitor has risen by an amount of $\Delta V_1$ volts, see FIG. 2*e*. During the time interval $\tau_4$ the capacitor $C_1$ is discharged through the transistor $T_2$ until the voltage across this capacitor has become equal to $-(E-V_d)$ volts, where $V_d$ is the threshold voltage of the transistor $T_2$ associated with the signal value $\Delta V_1$. During the time interval $\tau_5$ the capacitor $C_1$ is charged through the transistor $T_1$. The voltage rise across the capacitor $C_1$ will be equal to the voltage drop across the capacitor $C_0$ during the time interval under consideration. Consequently, the said voltage rise will be equal to $(\Delta V_2-\delta)$ volts. During the time interval $\tau_6$ the capacitor $C_1$ is discharged through the transistor $T_2$ until the voltage across this capacitor has become equal to $-(E-V_d)$ volts, where $V''_d$ is the threshold voltage of the transistor $T_2$ associated with the signal value $(\Delta V_2-\delta)$. Since $\delta$ is much smaller than $\Delta V_2$, we have to a good approximation: $V''_d=V'_d$. This means that the voltage drop across the capacitor $C_1$ during the time interval $\tau_6$ will be equal to $(\Delta V_2-2\delta)$ volts instead of to $\Delta V_2$ volts, as it should have been. A simple calculation shows that the voltage drop across the capacitor $C_n$ of the capacitive store of FIG. 1, which voltage drop corresponds to the voltage drop $(\Delta V_2-\delta)$ volts across the capacitor $C_0$ during the time interval $\tau_5$, will be equal to $(\Delta V_2-n.\ \delta)$ volts, where $n$ is the number of the capacitor $C_n$. However, this will hold only if $n.\ \Delta$ is small compared with $\Delta V_2$. If $n.\ \delta$ becomes comparable to $\Delta V_2$, i.e. if $n$ is large, the corresponding voltage drop will be equal to $(1-\delta)^n$ volts. However, if $n.\ \delta$ becomes comparable to the signal value $\Delta V_2$, second-order and third-order effects also will occur. This means that in contradistinction to the example discussed with reference to FIGS. 2*d* and 2*e* in which one signal value only was not correct (see the interval $\tau_5$ of FIG. 2*d* and the interval $\tau_6$ of FIG. 2*e*), at least two successive signal values will not be correct, as is shown diagrammatically in FIG. 2*f*. In this Figure the signal values during the intervals $\tau_m$ and $\tau_{m+2}$ are not correct. During the interval $\tau_m$ the signal value is equal to $(\Delta V_2-\delta_{11})$ volts, and during the interval $\tau_{m+2}$ it is equal to $(\Delta V_2-\delta_{22})$ volts. Not before the interval $\tau_{m+4}$ will the signal value be correct and equal to $\Delta V_2$ volts.

Figure 3:
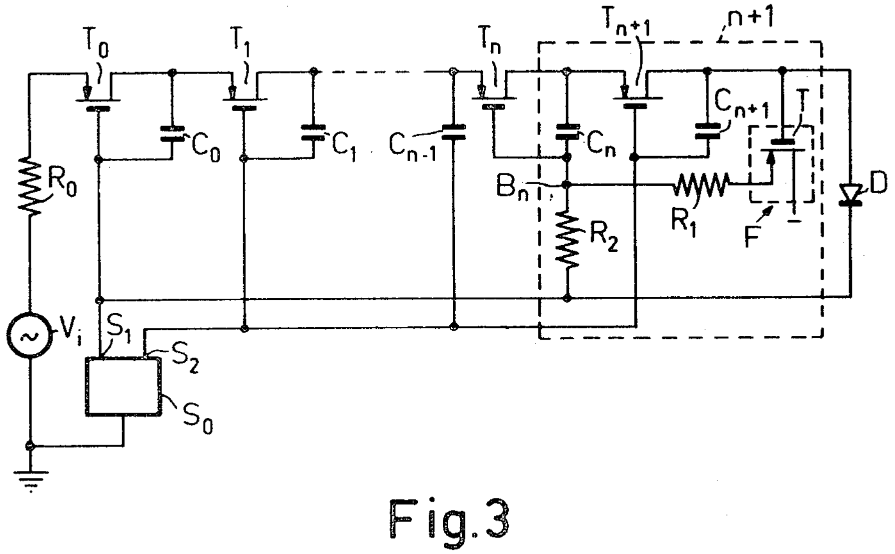
FIG. 3 shows an embodiment of an arrangement according to the invention and FIG. 4 shows the voltage waveforms at various points in the arrangement of FIG. 3.
Figure 4:
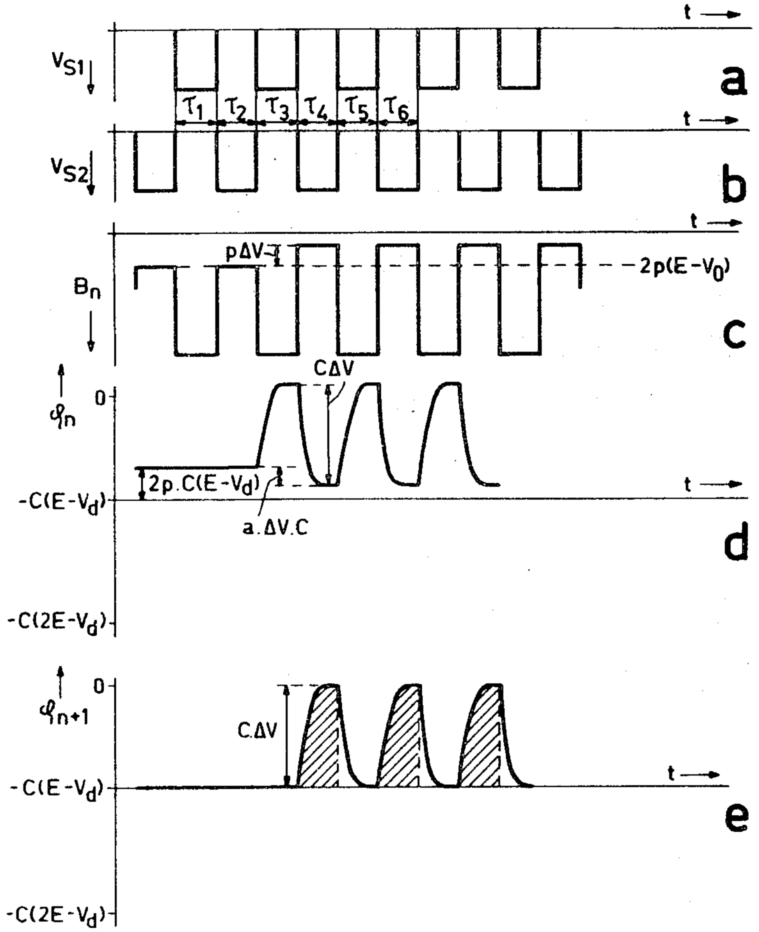

FIG. 3 shows a delay device according to the invention. It comprises transistors $T_0, T_1, \ldots, T_n$ and $T_{n+1}$ the main current paths of which have been connected in series. Capacitors $C_0$, $C_1, \ldots, C_n$ and $C_{n+1}$ have been connected between the drain and gate electrodes of the transistors $T_0, T_1, \ldots, T_n$ and $T_{n+1}$, respectively. The source of the transistor $T_0$ has been connected to a point of constant potential through the series combination of a resistor $R_0$ and a signal voltage source $V_i$. The gate of the transistor $T_0$ has been connected to an output $S_1$ of a switching voltage source $S_0$, and the gates of the transistors $T_1$ and $T_{n+1}$ have been connected to an output $S_2$ of the switching voltage source $S_0$. The gate of the transistor $T_n$ has been connected to the output $S_1$ of the switching voltage source $S_0$ through a resistor $R_2$. The drain of the transistor $T_{n+1}$ has been connected, through a diode D, to the output $S_1$ of the switching voltage source $S_0$ and also, through a follower circuit F and a resistor $R_1$, to the gate of the transistor $T_n$. The operation of the delay device of FIG. 3 will be described with reference to FIG. 4.

FIGS. 4*a* and 4*b* show the voltage waveforms at the outputs $S_1$ and $S_2$ of the switching voltage source. FIG. 4*c* shows the voltage at a point $B_n$ of the delay device and FIGS. 4*d* and 4*e* show the charges present in the capacitors $C_n$ and $C_{n+1}$ respectively as functions of time. During the time interval $\tau_0$ information from a capacitor preceding the capacitor $C_{n-1}$ is transferred to the capacitor $C_{n-1}$. It is assumed that during this interval no charge is transferred to the capacitor $C_{n-1}$. This means that the final charge in this capacitor is equal to $-C(E-V_d)$ coulombs, where $C$ is the capacitance of the capacitors $C_{n-1}$, $C_n$ and $C_{n+1}$. It is further assumed that during the same time interval no charge is transferred between the capacitors $C_n$ and $C_{n-1}$. This means that during the said interval the voltage at the point $B_n$ will be equal to $-2p(E-V_d)$ volts, where $p$ is equal to the quotient $(R_2/R_1+R_2)$. This means that during the said interval the charge in the capacitor $C_n$ will be equal to $$Q_n(0)=-C(1-2p)(E-V_d)\text{ coulombs} \quad (1)$$

During the time interval $\tau_1$ no charge is transferred between the capacitor $C_{n-1}$ and the capacitor $C_n$, since during this interval the transistor $T_n$ will not be conductive. This means that the charge $Q_n(1)$ will be equal to the charge $Q_n(0)$, see FIG. 4*d*. It is assumed that during the time interval $\tau_2$ a charge equal to $(1-a)\cdot\Delta V\cdot C$ is transferred to the capacitor $C_{n-1}$, where $a$ is an attenuation factor and $\Delta V$ is the value of the signal sample as initially applied to the input of the delay device. During the same time interval no charge transfer takes place between the capacitors $C_n$ and $C_{n+1}$, so that the charge states of these capacitors will remain unchanged, see FIGS. 4*d* and 4*e*. During the time interval $\tau_3$ no charge transfer takes place between the capacitors $C_{n-1}$ and $C_n$. A charge equal to $(1-a)\cdot\Delta V\cdot C$ coulombs is supplied to the capacitor $C_n$. Hence, the final charge in this capacitor will be equal to $$Q_n(3)=\{-(1-2p)(e-V_d)+(1-a)\Delta V\}\text{coulombs} \quad (2)$$

see FIG. 4*d*. During the time interval $\tau_4$ a charge transfer takes place between the capacitors $C_n$ and $C_{n+1}$. At the beginning of this time interval the charge in the capacitor $C_{n+1}$ is equal to $-C(E-V_d)$ coulombs, see FIG. 4*e*, whilst the initial charge in the capacitor $C_n$ is given by the relation (2). At the end of the interval under consideration, the voltage across the capacitor $C_{n+1}$ is desired to be equal to $-(E-V_d)+\Delta V$ volts, since in this event the attenuation involved will be compensated. This will be achieved if a charge equal to $C\cdot\Delta V$ coulombs is transferred from the capacitor $C_n$ to the capacitor $C_{n+1}$. Consequently, the final charge in the capacitor $C_n$ will be equal to $$(Q_n(4)=C\{-(1-2p)(E-V_d)+(1-a)\Delta V-\Delta V\}\text{ coulombs} \quad (3)$$

see FIG. 4*d*. On the other hand, if the final voltage across the capacitor $C_{n+1}$ is equal to $(E-V_d)+\Delta V$ volts, the voltage at the point $B_n$ will be equal to $-2p(E-V_d)+p\Delta V$ volts, see FIG. 4*c*. The voltage at the source of the transistor $T_{n+1}$ will be equal to $-(E-V_d)$ volts during the charge transfer. Hence the voltage across the capacitor $C_n$ will be equal to $-(1-2p)(E-V_d)-p\Delta V$ volts and consequently the charge in the capacitor $C_n$ will be equal to $$Q'_n=C\{-(1-2p)(E-V_d)-(p\,\Delta V\}\text{ coulombs} \quad (4)$$

A closer consideration of the relations (3) and (4) will show that by making $p=a$ the desired compensation for the attenuation is obtainable.

In the delay device shown in FIG. 3, the compensation circuit has been included in the final stage $(n+1)$. For practical reasons it may be desirable for the compensation circuit to be included not in the final stage but in one of the preceding stages. In this case, however, it is desirable to make $p>>a$ with some consequent overcompensation which will enable the correct frequency characteristic to be obtained at the output of the delay device. When the delay device comprises a large number of stages, several stages may be provided with overcompensation, which additionally achieves an improved signal-to-noise ratio of the delay device. Instead of in series with the capacitor $C_n$ the resistor $R_2$ may be connected between the gate of the transistor $T_{n+1}$ and the output $S_2$ of the switching voltage source $S_0$ with the interposition of an inverter. Further, instead of the resistors $R_1$ and $R_2$ a capacitor $C_x$ may be connected between the source of the transistor $T_{n+1}$ and the source of the transistor T, in which case the source of the transistor T is also connected through a resistor to a point of constant potential. The feedback factor $p$ will in this case be equal to $(C_x/C)$, where $C$ is the capacitance of the capacitor $C_n$ and $C_x$ is the capacitance of the aforementioned capacitor. Also, the follower circuit shown in FIG. 3 may be replaced by any other follower circuit. In addition, the device shown in FIG. 3 is suitable to be at least partially integrated in a semiconductor body.

What is claimed is:

1. A device for delaying a train of signal samples of an electrical signal, comprising a plurality of interconnected stages, each stage comprising a transistor having a control input and a main conduction path comprising a signal input and a signal output, wherein current through the main conduction path is a function of voltage between the control input and the signal input thereof, each stage further comprising a capacitor and first means for connecting the capacitor across the control input and signal output of the transistor, the device further comprising second means for serially connecting the main conduction paths of the transistors in all of the stages, means connected to the control inputs of the transistors in all of the stages for receiving switching pulses having a magnitude sufficient to render alternate transistors of the device conducting, and feedback means connecting the signal output of a transistor in a selected stage of the device to the signal input of the transistor in the selected stage for feeding a portion of the voltage on the capacitor of the selected stage to the signal input terminal of the associated transistor.

2. A device as claimed in claim 1, further comprising a first resistor serially connected with the capacitor of a stage preceeding the selected stage and the signal input of the transistor in the selected stage, a second resistor connected to the first resistor and the capacitor of the stage preceeding the selected stage and a non-inverting amplifier having an output connected through the second resistor to the first resistor and an input connected to the signal output of the transistor in the selected stage.

3. A device as claimed in claim 2, wherein the non-inverting amplifier comprises a field effect transistor, the drain and gate electrodes of which form the output and input respectively of the non-inverting amplifier circuit.

4. A device as claimed in claim 1, wherein a substantial portion of the device is integrated in a semiconductor body.

* * * * *